Figure 1:
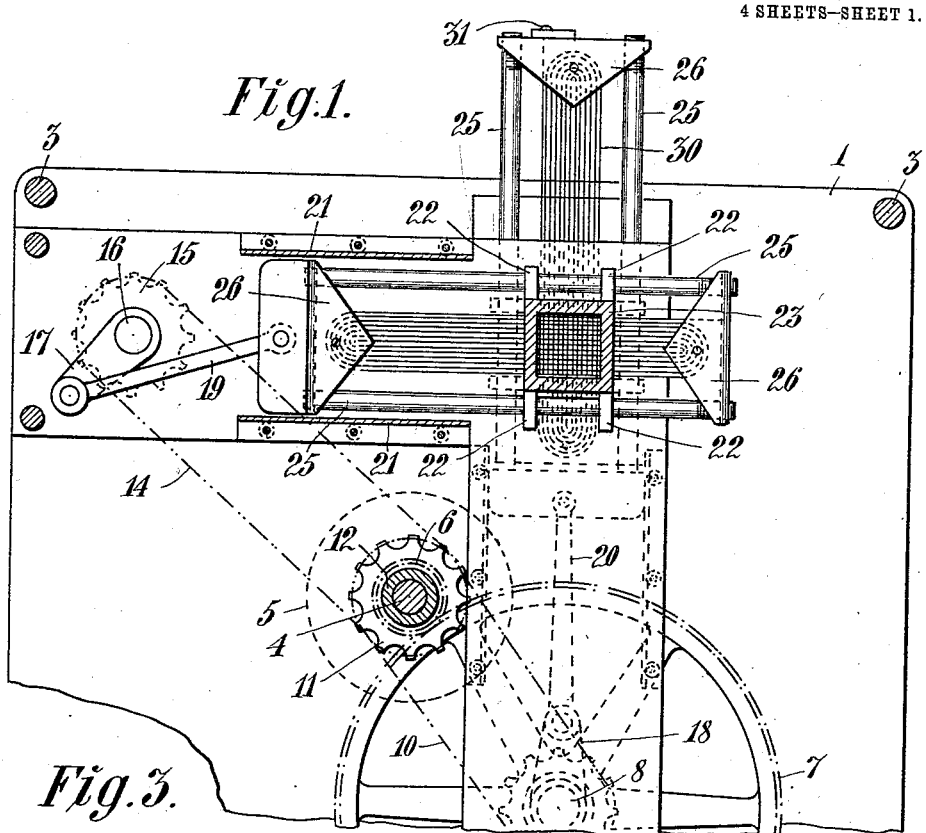

U. S. SJÖSTRAND & H. A. PETTERSON.
MACHINE FOR CUTTING LARD AND THE LIKE.
APPLICATION FILED OCT. 7, 1909.

1,008,208.

Patented Nov. 7, 1911.

4 SHEETS—SHEET 1.

Witnesses

Inventors
U. Severin Sjöstrand
Henrik A. Petterson

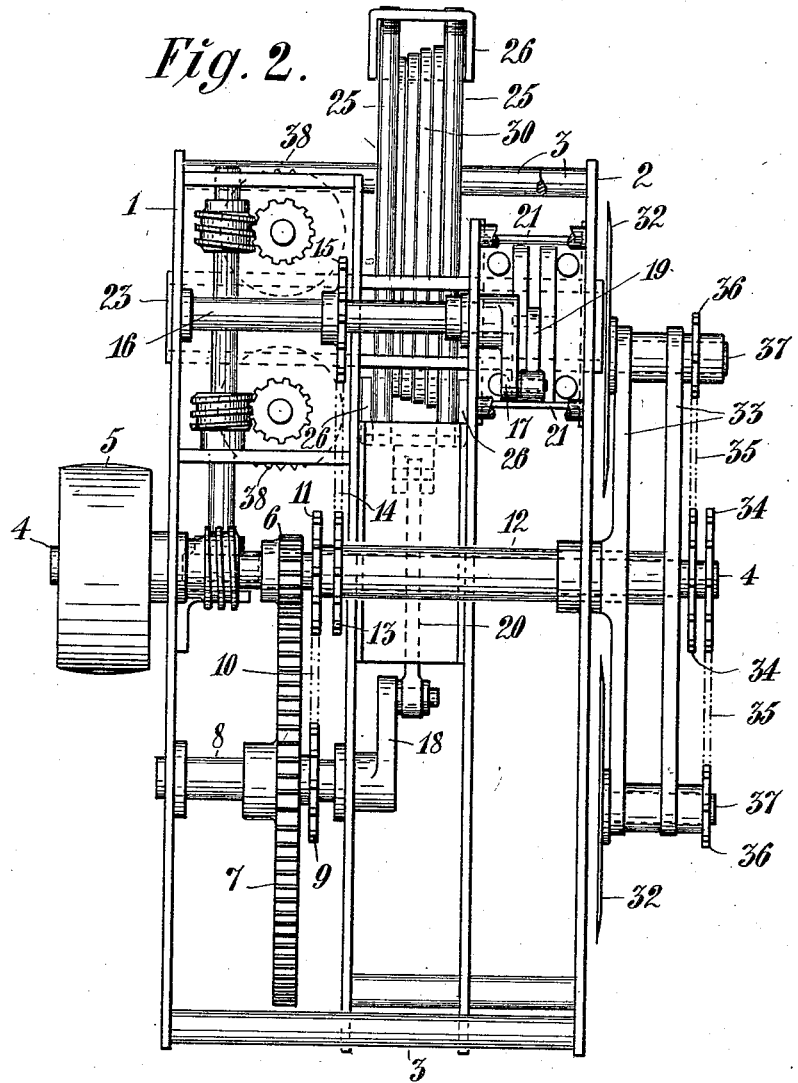

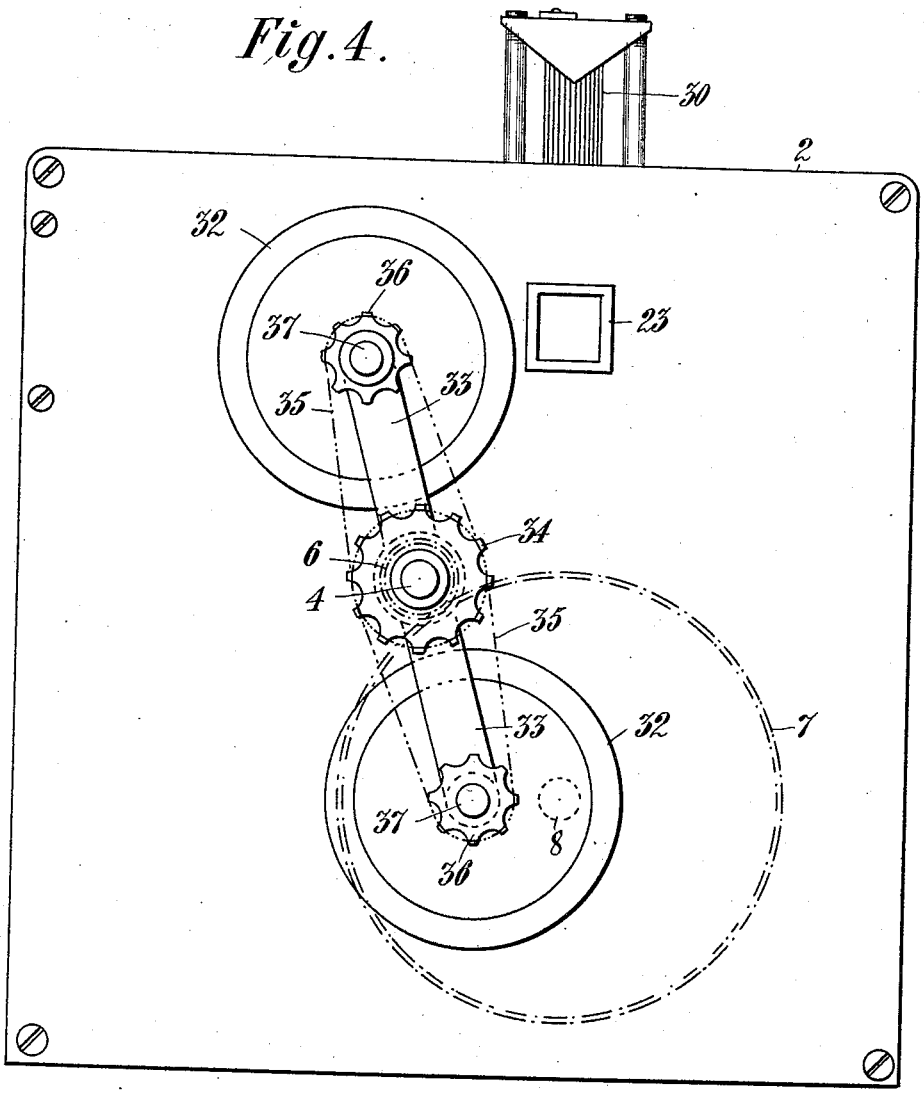

U. S. SJÖSTRAND & H. A. PETTERSON.
MACHINE FOR CUTTING LARD AND THE LIKE.
APPLICATION FILED OCT. 7, 1909.
1,008,208.
Patented Nov. 7, 1911.
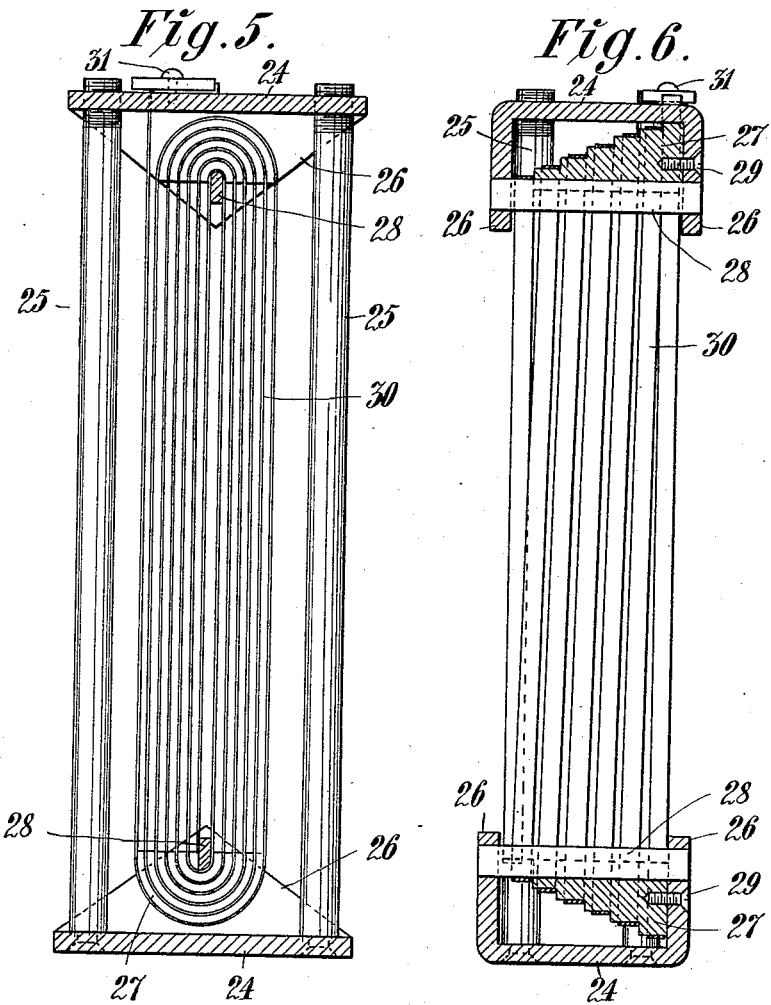

UNITED STATES PATENT OFFICE.

ULRIK SEVERIN SJÖSTRAND AND HENRIK AUGUST PETTERSON, OF SUNDBYBERG, NEAR STOCKHOLM, SWEDEN, ASSIGNORS OF ONE-FOURTH TO SVEN MATTSSON, OF MÖRRUM, SWEDEN.

MACHINE FOR CUTTING LARD AND THE LIKE.

1,008,208.  Specification of Letters Patent.  Patented Nov. 7, 1911.

Application filed October 7, 1909  Serial No. 521,629.

*To all whom it may concern:*

Be it known that we, ULRIK SEVERIN SJÖSTRAND and HENRIK AUGUST PETTERSON, subjects of the King of Sweden, and residents of Sundbyberg, near Stockholm, in the Kingdom of Sweden, have jointly invented new and useful Improvements in Machines for Cutting Lard and the Like, of which the following is a specification, reference being had to the drawings accompanying and forming a part hereof.

This invention relates to machines for cutting lard and the like. In certain machines of this kind the reciprocating knives by which the lard is cut into thin strings are formed by a steel band extended in a zigzag manner round about pins or the like placed at opposite edges of a frame or carrier. The knives are formed by the parallel parts of the band lying between two opposite sides of the carrier. In the machines of this kind hitherto known all the band parts forming the knives have been lying in one plane. It is, however, well known that in machines for cutting lard and the like it is of advantage to place the knives by steps so that all the knives do not cut at a time in one plane. By this means the resistance to the knives is diminished which is a principal condition for obtaining sharp cuts.

The object of the invention is to provide a cutting device in which the knives are formed by a band mounted in such a manner that the different parts thereof are arranged by steps so that the knives will cut in the string of lard one after the other.

The invention consists, chiefly, in the combination of a reciprocating frame, saddles having steps at the sides remote from each other, and a thin knife band wound around the steps of the saddles in such a manner as to pass from one step of the one saddle round about a step of the other saddle displaced relatively to the former in the transverse direction of the band.

The invention further comprises the constructions and combinations of parts hereinafter described and claimed.

In the drawings, we have shown a machine embodying the invention.

Figure 3:
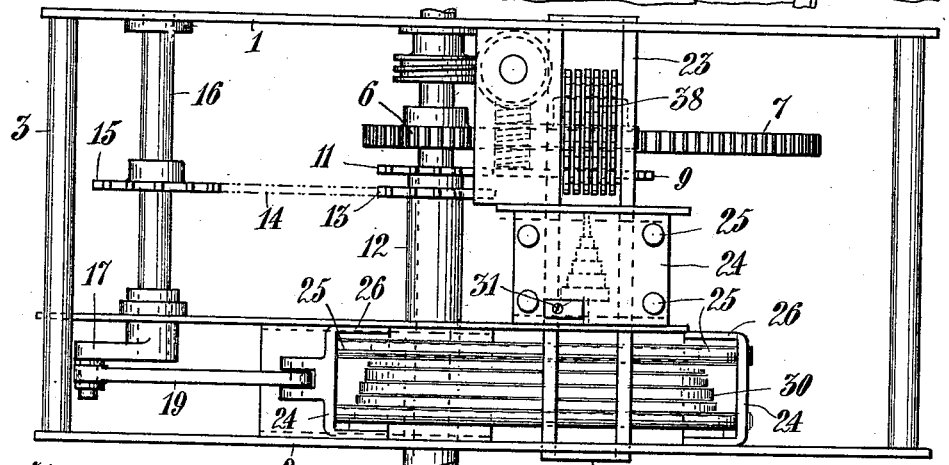

Figure 1 is a front view of the machine with the front plate and the parts mounted thereon removed. Fig. 2 is a side view of the machine. Fig. 3 is a plan view thereof. Fig. 4 is a front view of the plate removed from Fig. 1, said plate carrying means for cutting the thin strings of lard into squares. Fig. 5 is a front view of a set of knives for cutting the lard into slices or strings. Fig. 6 is a longitudinal sectional view of the said knives, and Fig. 7 is a cross-sectional view thereof.

Referring to the drawings, the frame of the machine consists of two plates 1 and 2 connected together by suitable stays or ties 3. Mounted in the plates 1 and 2 is an axle 4 carrying a pulley 5. Attached to the axle 4 is a cog-wheel or pinion 6 coöperating with a larger cog-wheel 7 on a second axle 8. Attached to the axle 8 is a sprocket wheel 9 transmitting motion through a chain 10 to a second sprocket wheel 11 attached to a sleeve 12 loosely mounted on the axle 4. Attached to the sleeve 12 is a further sprocket wheel 13 transmitting motion through a chain 14 to a sprocket wheel 15 attached to an axle 16. Each of the two axles 16 and 8 is provided with a crank 17, 18, respectively, said cranks being connected by connecting rods 19, 20 to the two sets of knives movable at right angles to each other. As shown in Fig. 1, each set of knives is movable in guides 21 and is moreover guided by parts 22 suitably projecting from the sides of the feeding drum 23 inclosing the forward moving large string of lard. The frame of each set of knives consists (see Figs. 5–7) of two endpieces 24, each having two opposite edges 26 bent inwardly as shown in the drawing. The endpieces are held together by four rods 25 extending between the same, said rods being suitably attached to one endpiece 24 and screwed into the other. Placed between the inwardly bent parts 26 of the endpieces 24 are the saddles 27 serving to support the knife bands. Each separate saddle is kept in position by a rod 28 or the like inserted between the parts 26 and entering into a corresponding recess in the saddle. A screw 29 inserted through either part 26 into the saddle prevents the latter from turning around the rod.

As clearly shown, the saddle 27 is formed with steps and suitably semi-circular with the steps at the rounded part. Wound around the steps is the thin steel-band 30 forming the set of knives, as shown in Fig.

5. One end of the band is suitably fastened to one of the rods 28 and passes therefrom round about one step after the other until the part of the band extending from the outermost step passes past the one saddle 27 through the adjacent endpiece 24 to the outer side of which it is attached by a screw 31 or otherwise. The band thus attached forms two sets of knives which are symmetrical, when viewed toward the edges, Fig. 5, relatively to a middle plane. In the embodiment shown two knives are placed foremost so as to first cut in the string of lard, the other knives following by steps, one after the other, at each side of the two middle knives. It is easily understood that such a knife band may be very thin. The cutting edge of the band may be tapered to a fine edge or the band itself may be so thin as to reliably cut without being sharpened. The knives are thus as thin and sharp as possible and, moreover, they have all the same tension so as to all exert the same action on the material by which the cutting will be quite uniform. Moreover, on account of the symmetrical arrangement of the knives, the resistance to the same, exerted by the material to be cut will be uniformly distributed by which the drawback of the material being liable to yield is avoided. Furthermore, the band is easily detachable and may be easily placed in position. It is also far stronger than in the case of the knives being attached each for itself.

The two sets of knives movable at right angles to each other pass through corresponding openings in the wall of the feed drum 23 inclosing the string of lard, and the connecting-rods transmitting motion to the knives are connected, as shown in the drawing, to one endpiece 24 of each set of knives. The tensioning or slackening of the knives is suitably performed by turning the rods 25 the screw-threaded ends of which will thereby cause the correspondingly threaded endpiece 24 to move away from or toward the other endpiece.

The feed drum 23 passes through the frame plate 2. Moving just outside the mouth of the drum are two circular knives 32 (see Figs. 2 and 4). These knives are rotatably mounted at the ends of a crosspiece 33 attached to the end of the sleeve 12 passing through the plate 2. Attached to the end of the axle 4 projecting from within the sleeve 12 are two sprocket wheels 34 connected by chains 35 to sprocket wheels 36 attached to the axles 37 of the circular knives. The gearing is suitably such that, if the axle 4 makes for instance 700 revolutions, the circular knives will at the same time make 1000 revolutions. By the combined swinging and rapidly rotating movement of the knives the latter obtain a capacity of cutting extremely sharp so that all the small squares of lard obtain the same regular form bounded by smooth plane surfaces which in this art is of the greatest importance.

The feeding device suitably consists of two feed rollers 38 passing through the walls of the feed drum 23, said rollers being slowly rotated by any suitable means.

We claim:

1. In a machine for cutting lard, the combination of a reciprocating frame, saddles having steps at the sides remote from each other, the steps of the two saddles being displaced relatively to each other in the direction of movement of the material to be cut, and a thin knife band wound successively around the steps of the saddles, substantially as and for the purpose set forth.

2. In a machine for cutting lard, the combination of a reciprocating frame, saddles having at the sides remote from each other steps forming concentric semi-circular arcs displaced relatively to each other in the direction of movement of the material to be cut, and a thin knife band wound successively around the steps of the saddles, substantially as and for the purpose set forth.

ULRIK SEVERIN SJÖSTRAND.
HENRIK AUGUST PETTERSON.

Witnesses:
  Aug. Sörenson,
  Karl Runcskog.

---

Copies of this patent may be obtained for five cents each, by addressing the "Commissioner of Patents, Washington, D. C."